US010706045B1

(12) United States Patent
Hasija et al.

(10) Patent No.: US 10,706,045 B1
(45) Date of Patent: Jul. 7, 2020

(54) NATURAL LANGUAGE QUERYING OF A DATA LAKE USING CONTEXTUALIZED KNOWLEDGE BASES

(71) Applicant: INNOVACCER INC., San Francisco, CA (US)

(72) Inventors: Kanav Hasija, Nagar New Delhi (IN); Kartik R. Sayani, Ghaziabad (IN)

(73) Assignee: INNOVACCER INC., San Francisco, CA (US)

(*) Notice: Subject to any disclaimer, the term of this patent is extended or adjusted under 35 U.S.C. 154(b) by 0 days.

(21) Appl. No.: 16/387,016

(22) Filed: Apr. 17, 2019

(30) Foreign Application Priority Data

Feb. 11, 2019 (IN) .............................. 201921005332

(51) Int. Cl.
*G06F 16/00* (2019.01)
*G06F 16/242* (2019.01)
*G06F 16/245* (2019.01)
*G06F 16/248* (2019.01)

(52) U.S. Cl.
CPC .......... *G06F 16/243* (2019.01); *G06F 16/245* (2019.01); *G06F 16/248* (2019.01)

(58) Field of Classification Search
CPC .... G06F 16/243; G06F 16/245; G06F 16/248; G06F 16/156; G06F 16/338; G06F 16/438; G06F 16/638; G06F 16/738; G06F 16/838; G06F 16/9038
See application file for complete search history.

(56) References Cited

U.S. PATENT DOCUMENTS

| | | | | |
|---|---|---|---|---|
| 6,408,294 B1* | 6/2002 | Getchius | ........... | G06F 16/24534 |
| 6,484,161 B1* | 11/2002 | Chipalkatti | ............ | G06Q 30/02 |
| 7,047,242 B1* | 5/2006 | Ponte | ..................... | G06Q 10/00 |
| 7,611,466 B2 | 11/2009 | Chalana et al. | ..... | A61B 8/0858 |
| 8,849,693 B1* | 9/2014 | Koyfman | ............... | G06Q 30/02 |
| | | | | 705/14.1 |

(Continued)

FOREIGN PATENT DOCUMENTS

| WO | WO 2018/057647 | 3/2018 | ............... C12Q 1/68 |
|---|---|---|---|
| WO | WO 2018/166853 | 9/2018 | ............. G16H 10/60 |

OTHER PUBLICATIONS

U.S. Appl. No. 16/363,897, filed Mar. 25, 2019, Bhabesh et al.

(Continued)

*Primary Examiner* — Noosha Arjomandi
(74) *Attorney, Agent, or Firm* — Hayes Soloway P.C.

(57) ABSTRACT

A method of querying a data lake using natural language includes: receiving a natural language query directed to an electronic data lake; parsing the natural language query to determine a plurality of entities within the natural language query; identifying the plurality of entities using at least one contextual knowledge base, wherein the plurality of entities are compared against at least one entry in the at least one contextual knowledge base; mapping a dependency of the plurality of identified entities based on the parsed natural language query; constructing a structured data query based on the plurality of identified entities and the mapped dependency; and automatically generating a visual output of a result of the structured data query based on at least one characteristic from the set of: a data type, a data format, and a data size of the result of the structured data query.

18 Claims, 4 Drawing Sheets

(56) References Cited

U.S. PATENT DOCUMENTS

| | | | | |
|---|---|---|---|---|
| 8,977,953 | B1* | 3/2015 | Pierre | G06F 40/284 |
| | | | | 715/230 |
| 9,542,393 | B2* | 1/2017 | Morton | G06F 16/7844 |
| 9,727,591 | B1* | 8/2017 | Sharma | G06F 21/6227 |
| 10,056,078 | B1* | 8/2018 | Shepherd | G06F 16/632 |
| 10,147,504 | B1 | 12/2018 | Stettin et al. | G16H 50/30 |
| 2003/0018633 | A1 | 1/2003 | Horn | G06F 17/18 |
| 2004/0215629 | A1* | 10/2004 | Dettinger | G06F 16/2452 |
| 2005/0065956 | A1 | 3/2005 | Brown | G06F 16/252 |
| 2005/0107902 | A1 | 5/2005 | Blouin et al. | G06Q 10/087 |
| 2005/0119534 | A1 | 6/2005 | Trost et al. | G06F 19/00 |
| 2005/0131778 | A1 | 6/2005 | Bennett et al. | G06Q 10/0875 |
| 2006/0041539 | A1 | 2/2006 | Matchett et al. | G06Q 10/0639 |
| 2006/0075001 | A1 | 4/2006 | Canning et al. | G06F 8/65 |
| 2007/0239724 | A1* | 10/2007 | Ramer | G06F 16/951 |
| 2009/0313232 | A1 | 12/2009 | Tinsley et al. | G06Q 30/02 |
| 2010/0121879 | A1 | 5/2010 | Greenberg | G06F 16/248 |
| 2010/0199169 | A1 | 8/2010 | Gnech et al. | G06F 16/972 |
| 2010/0287162 | A1* | 11/2010 | Shirwadkar | G06F 16/3338 |
| | | | | 707/740 |
| 2012/0253793 | A1 | 10/2012 | Ghannam | G06F 17/27 |
| 2013/0197936 | A1 | 8/2013 | Willich | G06Q 50/22 |
| 2014/0006061 | A1 | 1/2014 | Watanabe et al. | G06Q 40/08 |
| 2014/0149446 | A1 | 5/2014 | Kuchmann-Beauger | |
| | | | | G06F 17/30389 |
| 2014/0188835 | A1* | 7/2014 | Zhang | G06F 40/211 |
| | | | | 707/706 |
| 2014/0344261 | A1 | 11/2014 | Navta et al. | G06F 16/951 |
| 2015/0164430 | A1 | 6/2015 | Hu et al. | A61B 5/7264 |
| 2015/0363478 | A1 | 12/2015 | Haynes | G06F 16/951 |
| 2016/0098387 | A1 | 4/2016 | Bruno | G06F 17/27 |
| 2016/0162473 | A1* | 6/2016 | Cogley | G06F 40/51 |
| | | | | 704/9 |
| 2016/0371453 | A1 | 12/2016 | Bowman | G06F 40/169 |
| 2016/0373456 | A1* | 12/2016 | Vermeulen | G06F 16/3329 |
| 2017/0091162 | A1 | 3/2017 | Emanuel et al. | G06F 40/169 |
| 2017/0102693 | A1* | 4/2017 | Kidd | G05B 19/41865 |
| 2017/0161372 | A1* | 6/2017 | Fern Ndez | G06F 16/35 |
| 2017/0199928 | A1* | 7/2017 | Zhao | G06F 16/24578 |
| 2017/0256173 | A1* | 9/2017 | Burford | G06N 20/00 |
| 2017/0344646 | A1* | 11/2017 | Antonopoulos | H04L 9/008 |
| 2017/0371881 | A1 | 12/2017 | Reynolds et al. | |
| 2018/0052842 | A1* | 2/2018 | Hewavitharana | G06F 16/951 |
| 2018/0158146 | A1* | 6/2018 | Turner | G06Q 40/02 |
| 2018/0225320 | A1 | 8/2018 | Saini et al. | G06F 16/215 |
| 2018/0232443 | A1* | 8/2018 | Delgo | G06Q 30/06 |
| 2018/0367557 | A1* | 12/2018 | Brown | H04L 63/1425 |
| 2019/0012390 | A1* | 1/2019 | Nishant | G06F 17/30867 |
| 2019/0050445 | A1 | 2/2019 | Griffith et al. | G06K 9/6262 |
| 2019/0156198 | A1* | 5/2019 | Mars | G06N 20/20 |
| 2019/0179820 | A1* | 6/2019 | El Kaed | G06F 16/256 |
| 2019/0180757 | A1* | 6/2019 | Kothari | G06F 21/32 |
| 2019/0324964 | A1* | 10/2019 | Shiran | G06N 20/00 |

OTHER PUBLICATIONS

U.S. Appl. No. 16/568,830, filed Sep. 12, 2019, Kumar et al.
Office Action issued in U.S. Appl. No. 16/363,897, dated Sep. 9, 2019 (38 pgs).
Morid et al. "Supervised Learning Methods for Predicting Healthcare Costs: Systematic Literature Review and Empirical Evaluation", 2018, AMIA Annu Symp Proc. pp. 1312-1321.
Wang et al. "Detecting Transportation Modes Based on LightBGM Classifier from GPS Trajectory Data", 2018 26th International Conference on Geoinformatics, Kunming, 2018, pp. 1-7.
Zhang et al. "Health reform and out-of-pocket payments: lessens from China", Health Policy and Planning, vol. 29, Issue 2, Mar. 2014, pp. 217-226, https://doi.org/10.1093/heapol/czt006.
Iyengar et al. "A Trusted Healthcare Data Analytics Cloud Platform", 2018 IEEE 38th International Conference on Distributed Computing Systems (ICDCS), Vienna, 2018, pp. 1238-1249.
International Search Report and Written Opinion issued in PCT/US20/13802, dated Mar. 25, 2020 (10 pgs).
Office Action issued in U.S. Appl. No. 16/363,897, dated Feb. 26, 2020 (38 pgs).
Office Action issued in U.S. Appl. No. 16/743,175, dated Mar. 23, 2020 (21 pgs).
International Search Report and Written Opinion issued in PCT/US20/16827 dated Apr. 22, 2020 (7 pgs).

* cited by examiner

NATURAL LANGUAGE QUERYING OF A DATA LAKE USING CONTEXTUALIZED KNOWLEDGE BASES

CROSS REFERENCE TO RELATED APPLICATION

This application claims benefit of Indian Provisional Application Serial No. 201921005332 filed Feb. 11, 2019, the entire disclosure of which is incorporated herein by reference.

FIELD OF THE DISCLOSURE

The present disclosure is generally related to methods of querying data lakes and more particularly is related to data lake querying using contextualized knowledge bases.

BACKGROUND OF THE DISCLOSURE

Today, more data is stored than ever before. As the cost of storing data decreases, the amount of data stored increases. For companies it is estimated that digital data storage will increase by 40% year over year, representing a ten-fold increase in storage capacity over a 7-year period.

As data storage increases, however, so does the need to manage and process the data. Data management systems have not improved in line with increased demand for data storage. As a result, it has become more difficult to organize, explore, and view the data being stored. One method of data management includes management and analysis of metadata—a set of data that describes and gives information about other data. Companies using this method generally hire data analysts and information technology scientists to make sense of metadata. In addition to personnel costs, this can create additional issues for the companies managing their data. In particular, data analysts must translate information from managed data into insights that can be understood by executives or high-level decision-makers. In some cases, this can limit the ability of high-level decision-makers to ask relevant and insightful questions. In other cases, this can create a bottleneck or latency in data-driven decision-making, preventing decision-makers from acting quickly in response to new insights.

Thus, a heretofore unaddressed need exists in the industry to address the aforementioned deficiencies and inadequacies.

SUMMARY OF THE DISCLOSURE

Embodiments of the present disclosure provide a system and method for querying a data lake using natural language. Briefly described, in architecture, one embodiment of the method, among others, can be broadly summarized by the following steps: receiving a natural language query directed to an electronic data lake; parsing the natural language query to determine a plurality of entities within the natural language query; identifying the plurality of entities using at least one contextual knowledge base, wherein the plurality of entities are compared against at least one entry in the at least one contextual knowledge base; mapping a dependency of the plurality of identified entities based on the parsed natural language query; constructing a structured data query based on the plurality of identified entities and the mapped dependency; and automatically generating a visual output of a result of the structured data query based on at least one characteristic from the set of: a data type, a data format, and a data size of the result of the structured data query.

Embodiments of the present disclosure provide a system and apparatus for querying a data lake using natural language. Briefly described, in architecture, one embodiment of the system, among others, can be implemented as follows. The system for querying a data lake using natural language includes an electronic data lake, at least one contextual knowledge base; and a user computer device in communication with the electronic data lake and the at least one contextual knowledge base over at least one network. The user computer device is configured to: receive a natural language query directed to the electronic data lake; parse the natural language query to determine a plurality of entities within the natural language query; identify the plurality of entities using the at least one contextual knowledge base, wherein the plurality of entities are compared against at least one entry in the at least one contextual knowledge base; map a dependency of the plurality of identified entities based on the parsed natural language query; construct a structured data query based on the plurality of identified entities and the mapped dependency; and automatically generate a visual output of a result of the structured data query on a display of the user computer device, wherein the visual output is based on at least one characteristic from the set of: a data type, a data format, or a data size of the result of the structured data query.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
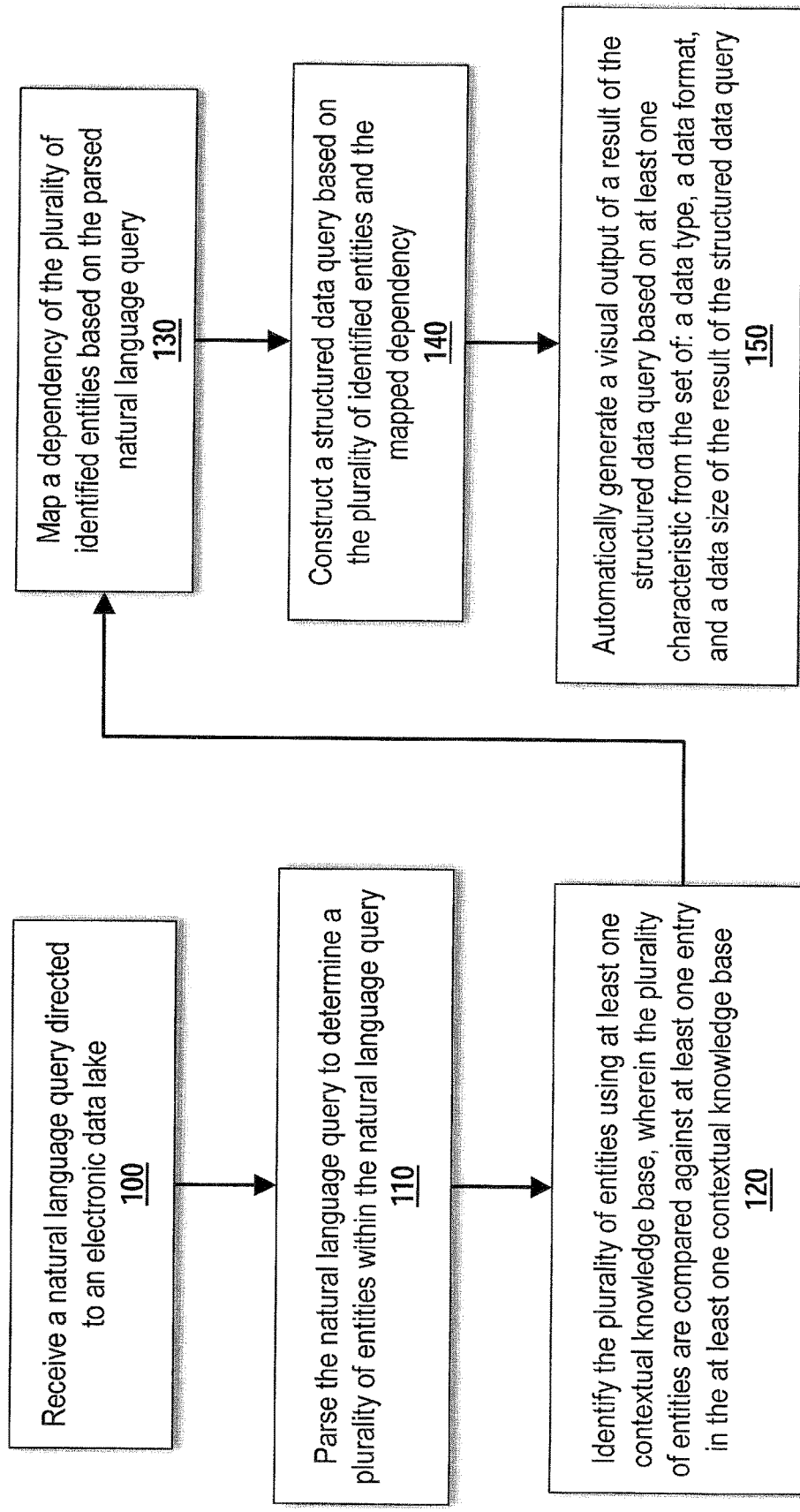
FIG. 1 is a flow chart illustrating a method for querying a data lake using natural language, in accordance with a first exemplary embodiment of the present invention.

FIG. 1 is a flow chart illustrating a method for querying a data lake using natural language, in accordance with a first exemplary embodiment of the present invention. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure. The method may further include any other features, components, or functions disclosed relative to any other figure of this disclosure.

Step 100 includes receiving a natural language query directed to an electronic data lake. The natural language query may be given by a user through an electronic computer device, such as a desktop computer, laptop, mobile phone, tablet, smartwatch, smart hub, and the like. The electronic computer device (hereinafter "computer") may be a single, local device, a remote device or system, or a distributed computing system as desired. The computer may be connected to the data lake via at least one network connection. The network connection may be wired or wireless, and may include local area connections, WLAN, Internet, intranet, WI-FI®, BLUETOOTH®, NFC, and other connection protocols. The natural language query may be entered through a software interface on the electronic computer device, for instance through a web form, an application query form, an e-mail form, and the like. Natural language queries may be made through text, audio, or video media, or some combination thereof. In one example, the user may provide the natural language query by entering a text query in a text box on a user interface. In another example, the user interface may provide the user with suggested queries based on the user's search history, a portion of the user's entered query, popular search queries, or other factors. A software application may track and analyze current and past search queries in order to provide suggested queries. For instance, the software application may include a database of potential query terms in order to provide a suggestion as the user is entering the query. The database may further include previously entered queries and popular or trending queries. The provided suggestions may be given before the user begins entering the query, while the query is being entered, or after the query has been entered, as a correction.

The natural language query may be a command, a question, or a portion thereof, relative to a spoken or written language. For instance, an English-language query related to a medical insurance system may include a command, such as, "Show me the number of members, by payer, with acute bronchitis." Alternatively, it may be phrased as a question, such as, "How many members, by payer, have acute bronchitis?" In another example, the query may simply be a portion of a sentence, such as, "Number of members, by payer, with acute bronchitis." The natural language query may be given in any written or spoken language, and may be used to make it easier for a user without technical knowledge of data query syntax to retrieve desired information from an electronic data repository.

The electronic data lake (hereinafter "data lake") may be any suitable data storage system used to store raw or transformed data. The data lake may include data from a plurality of sources and source types, including sensors, websites, apps, and the like. Data stored within the data lake may include a plurality of data types in their native data formats. In one example, the subject disclosure may also be applied to other forms of data storage, including relational databases, data warehouses, data marts, and operational data stores. For instance, relational databases, such as Microsoft SQL, Oracle, and Redshift databases may be used. While the methods of data capture and data normalization may vary for each form, the principles may be applied in particular ways to each one.

Step 110 includes parsing the natural language query to determine a plurality of entities within the natural language query. The natural language query may be divided into progressively more granular components through a parsing process. This is discussed in greater detail in FIG. 3, below. Once the parsing process has divided the natural language query into sufficiently granular components, the components may be determined to be a plurality of entities. An entity may be an object within the natural language query that indicates the data or result desired from the query. Put another way, an entity is an object around which the data structure revolves. An entity may point to a data type, a location, a relationship, or other characteristics to define the scope of the query. For instance, in a sales database having a number of data tables, exemplary entities may be categories such as "customers" or "deals". Data points such as "customer type" or "deal amount" may be metadata related to those entities.

Step 120 includes identifying the plurality of entities using at least one contextual knowledge base, wherein the plurality of entities are compared against at least one entry in the at least one contextual knowledge base. Once the plurality of entities within the natural language query has been determined, each entity may be identified. Identification is discussed in greater detail in FIG. 4, below. Generally, identification may be accomplished by comparing an entity against at least one entry in the at least one contextual knowledge base. If a match with an entry in a contextual knowledge base is made, the entity may be identified.

Step 130 includes mapping a dependency of the plurality of identified entities based on the parsed natural language query. The identified entities may depend, one on another, to determine the scope and context of the desired search query. For example, an entity that was initially given as an adjective in the natural language query may have a dependency relationship with an entity given as a noun and located in proximity to the adjective. As another example, an entity that was initially given as the verb of a sentence in the natural language query may have a dependency relationship with an entity given as the subject of the sentence. The dependency relationships may be determined as part of the parsing process discussed in greater detail in FIG. 3, below. The determined relationships may be used to map dependency relationships between the identified entities in order to determine the type and nature of data being queried.

Step 140 includes constructing a structured data query based on the plurality of identified entities and the mapped dependency. The structured data query may be in any suitable query language, including data definition language, data manipulation language, data query language, and the like. In one example, the structured data query may be constructed in Structured Query Language (SQL) commonly used in data storage repositories. The computer may construct the structured data query by converting the plurality of identified entities to portions of appropriate query syntax, and ordering or completing the query using the dependency relationships mapped in Step 130, above. This may allow the natural language query to be functionally converted to a structured data query.

The computer may submit the structured data query to the data lake via an Application Programming Interface (API), such as REST and others. The API may allow the computer to communicate the structured data query to the data lake and receive a result that can be displayed or further processed on the computer. The API may allow communication and interaction between the computer software engine that processes the natural language query and the database or data lake software. APIs may include SQL understandable by databases. The natural language query software engine may convert the natural language query to a structured query using SQL or another structured language.

Step 150 includes automatically generating a visual output of a result of the structured data query based on at least one characteristic from the set of: a data type, a data format, and a data size of the result of the structured data query. The visual output of the result may be one or more graphs, charts, tables, or any other method of visually displaying data. The computer may generate the visual output automatically based on rules followed in a decision tree. The decision tree may be determined by the user or set by an optimization algorithm. The decision tree may make decisions based on one or more characteristics of the returned data, including a data type, a data format, and/or a size of the returned data. The data type may include the nature of the data, i.e., whether it is visual, audio, numeric, and the like. The data format may include whether the data is tabular, integer, stored as comma-separated values, and the like. The size of the returned data may include the number of data points, the file size, and the like. In one example, the visual output may be displayed with the raw, returned data to allow the user to analyze the data most effectively.

Figure 2:
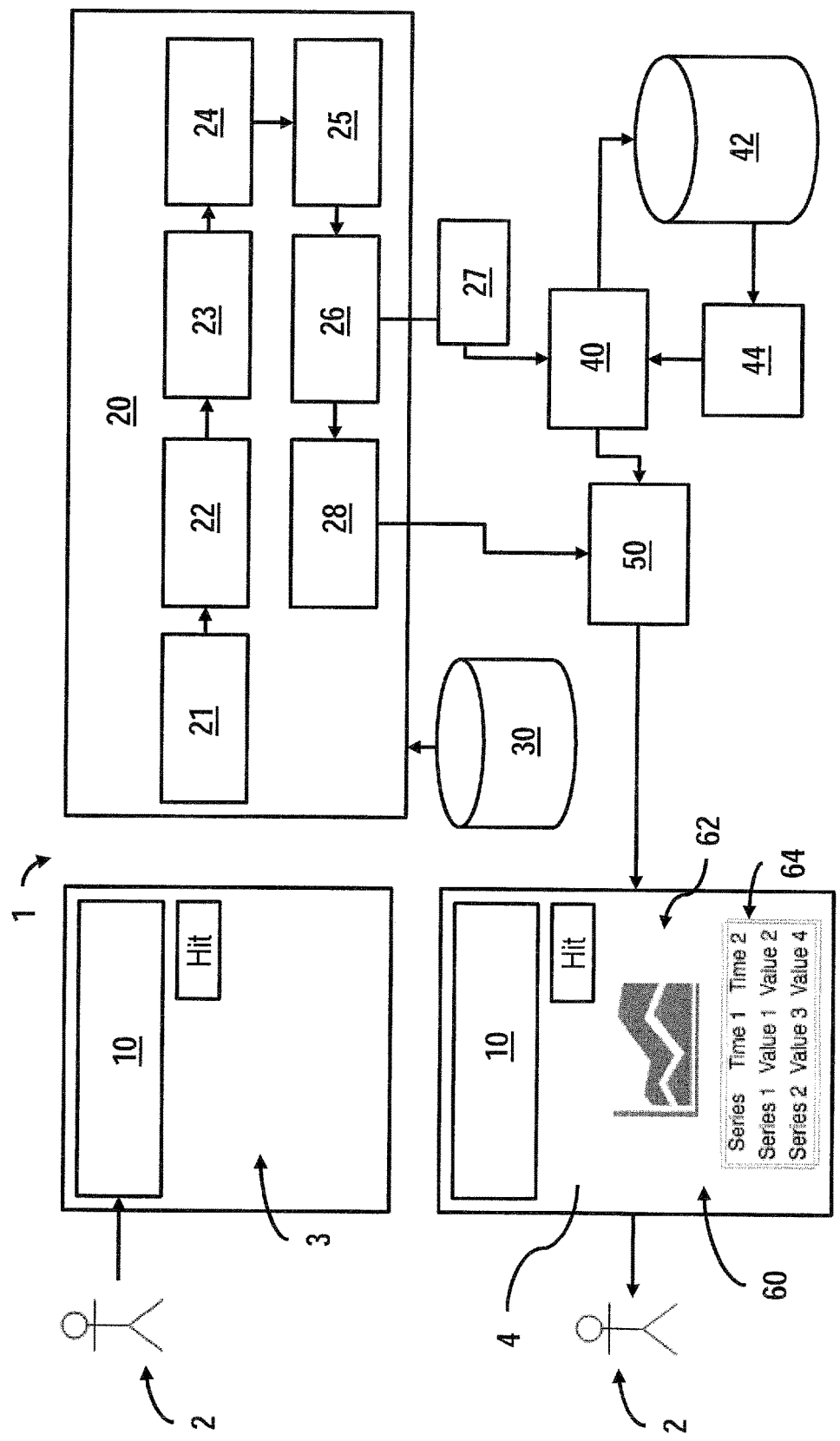
FIG. 2 is a flow diagram illustrating a system for querying a data lake using natural language, in accordance with the first exemplary embodiment of the present invention.

FIG. 2 is a flow diagram illustrating a system 1 for querying a data lake using natural language, in accordance with the first exemplary embodiment of the present invention. The flow diagram of FIG. 2 is a diagrammatical illustration of both the process logic for the query process and the hardware and software components used as part of the query process. The system 1 for querying a data lake 42 using natural language includes an electronic data lake 42, at least one contextual knowledge base 30; and a user computer device 3 in communication with the electronic data lake 42 and the at least one contextual knowledge base 30 over at least one network. The user computer device 3 is configured to: receive a natural language query 10 directed to the electronic data lake 42; parse the natural language query 10 to determine a plurality of entities within the natural language query 10; identify the plurality of entities using the at least one contextualized knowledge base, wherein the plurality of entities are compared against at least one entry in the at least one contextual knowledge base; map a dependency of the plurality of identified entities based on the parsed natural language query 10; construct a structured data query based on the plurality of identified entities and the mapped dependency; and automatically generate a visual output of a result of the structured data query on a display of the user computer device, wherein the visual output is based on at least one characteristic from the set of: a data type, a data format, or a data size of the result of the structured data query.

As described relative to FIG. 1, above, a user 2 may submit a natural language query 10 directed to a data lake 42. The user 2 may submit the natural language query 10 using a computer 3 having a user interface. The computer 3 may have any necessary and common hardware components, such as a processor, power supply, and non-transitory memory. The computer 3 may include a display 4, which may be any visual display such as a monitor, projector, screen, wearable, and the like. The display 4 may provide a visual display of the software of the system 1. The computer 3 may be connected to the data lake 42 by at least one network connection as discussed relative to FIG. 1, above.

The computer 3 may first process the natural language query 10 using a natural language query engine 20, which may include a natural language parser 21, entity identifier 22, dependency mapper 23, relationship mapper 24, aggregation and slice identifier 25, structured query constructor 26, and visual recommender 28.

The natural language parser 21 may parse the natural language query 10 to determine meaningful language components of the natural language query 10. The natural language parser 21 may break the natural language query 10 into granular components over one or more iterations in order to determine a plurality of entities within the natural language query 10. For example, the iterations may include parsing the query to determine sentences, parsing the sentences to determine parts of speech, and determining a dependency relationship between the parts of speech. This is discussed in greater detail in FIG. 3, below.

The entity identifier 22 may identify each of the plurality of entities located within the natural language query 10. The entity identifier 22 may identify entities by comparing each entity against at least one entry in at least one contextualized knowledge base 30. A contextualized knowledge base 30 may improve the accuracy of the entity identifier 22 and the resultant accuracy of the structured data query by providing context-specific data to support the entity identifier 22. One issue with creating structured data queries from natural language input is that general-purpose systems lack specific, and more importantly, contextualized knowledge to accurately translate natural language into structured data syntax. As a result, query translation based on generalized rules is usually not more than 60% accurate. A contextualized knowledge base 30 may be a database with industry or application-specific rules, data points, or other information. The contextualized knowledge base 30 may be focused on a particular application, such as healthcare, social networking, banking and finance, communications, education, and the like. The contextualized knowledge base 30 may act as a plugin-type data repository, allowing the system 1 to draw contextualized data when required. The contextualized knowledge base 30 may be updatable by users, either manually when entering data, or automatically when a connected database is updated. In this way, the system 1 may adapt to ever-changing industry knowledge as well as source data structures stored by the end user organizations within their data fabric. Entities may be compared against entries in one or more contextualized knowledge bases 30 within the system, depending on the nature of the entity and its relationship to other entities.

The system 1 may include a plurality of contextualized knowledge bases 30, including entity, entity thesaurus, code set, relationship table structure, aggregation and slice identifier, and visual recommender knowledge bases. An entity knowledge base may drive the tables in a tabular data structure, allowing the system 1 to determine the correct tables to query for the returned data. An entity knowledge base may indicate to the system 1 which data should be referenced. In one example directed to the healthcare insurance industry, the following structure may be created for an entity knowledge base:

| entity | table | uniqueness column | name column | numeric value |
|---|---|---|---|---|
| payer | insurance | payer_id | payer_name | — |
| lab_result procedure | lab_result procedure | result_code code | lab_test procedure_ name | result_value service_ unit_ quantity |
| ... | ... | ... | ... | ... |

In the example, the "entity" column may refer to an entry for an entity; the "table" column may refer to a related table to be referenced; the "uniqueness column" column may refer to a category of unique values; the "name column" column may refer to data identifying the entity; and the "numeric value" column may refer to a numeric value to be referenced. Thus, if a user wanted, for example, to find all of the unique payers located within the data lake 42, the system 1 would count all of the distinct records of the payer_id column. If a user wanted to find the number of bills related to a payer, the system 1 would group the results by payer_name when information from the insurance table is displayed in the resultant data. In another example, if a user wanted to find the average number of lab tests for a given procedure, the system 1 would filter data with the corresponding code using the result_code column, but average the lab results using the result_value column.

An entity thesaurus knowledge base may include a dataset corresponding to alternative names, titles, values, and words relating to a list of entities. This may be useful, as even within a particular industry, the names, titles, and general jargon used may vary from organization to organization. This may allow a user 2 querying the data lake 42 to search with fewer restrictions on the natural language search accuracy. The entity thesaurus knowledge base may, in one example, include a thesaurus in a spoken or written language relevant to the particular contextualized industry or application of the system 1. The thesaurus may allow the system 1 to match entities represented in the natural language query 10 using alternative names or words. In one example directed to the healthcare insurance industry, the following structure may be used:

| Similar name | Entity |
|---|---|
| insurance | payer |
| payor | payer |
| Insurance firm | payer |
| ... | ..... |

In this example, if the words "insurance", "payor", or "insurance firm" are used in the natural language query 10, the system 1 may direct the query to a "payer" entity. A thesaurus knowledge base may be populated from any relevant sources, including thesauruses generally and industry-specific thesauruses. The thesaurus knowledge base may indicate that a term corresponds to more than one entity depending on the context and usage of the term. This may be further determined by one or more additional contextual knowledge bases 30.

A code set knowledge base may allow the system 1 to determine how to identify a topic or phrase from the data stored within the data lake 42. Data structures within the code set knowledge base may include categorical fields which are represented with codes. These fields, when used together with additional entities, may allow the system 1 to effectively filter unwanted data and return only desired data.

In one example directed to the healthcare insurance industry, the following structure may be used:

| Concept | Codeset Type | Table | Column | Code | Code Description |
|---|---|---|---|---|---|
| Gender | Gender | Member | Gender | M | Male |
| Gender | Gender | Member | Gender | F | Male |
| Gender | Gender | Member | Gender | O | Other |
| Diabetes | Diagnosis | Diagnosis | Code | 250.00 | Diabetes Type I |
| Diabetes | Diagnosis | Diagnosis | Code | 251.00 | Diabetes Type II |
| ... | ... | ... | ... | ... | ... |

In this example, for instance, members who are male can be identified by filtering the Gender column in the Member table using the value M. In another example, members who have diabetes can be identified by filtering the Code column in the Diagnosis table with values of 250.00 or 251.00. The Codes may correspond to commonly-used encoding schemes, such as abbreviations (like "M" for male), medical coding numbers, rankings, database coding values, and the like.

A relationship table structure knowledge base may provide a guide of the table structure of all data that must be queried by the structured data query. In one example directed to the healthcare insurance industry, the following structure may be used:

| Table | Column | Datatype | Concept |
|---|---|---|---|
| member | id | longint | — |
| member | name | string | — |
| member | gender | string | gender |
| member | ethnicity | string | ethnicity |
| diagnosis | id | longint | — |
| diagnosis | diagnosis_code | string | diagnosis |
| diagnosis | diagnosis_name | string | — |
| ... | ... | ... | ... |

| Table 1 | Table 2 | Relationship |
|---|---|---|
| member | diagnosis | member.id = diagnosis.id |
| ... | ... | ... |

In this example, the relationships between the data in the member table and diagnosis table are shown and compared for later use by the system 1. The "table" column may refer to the name of a table containing particular or desired data; the "column" column may indicate the name of a particular column within the table; the "data type" column may indicate the nature of data within the related column; and the "concept" column may indicate the type of information contained within the column. This may allow the system 1 to fetch data from multiple tables stored within the data lake 42 by noting the relationships between various types and points of data and information. Common relational links between the tables are helpful in determining the intended structured query from the natural language query.

The aggregation and slice identifier knowledge base may provide a listing of keywords that help the system 1 identify notations pertaining to data segmenting requested by the user 2 for particular entities. In one example directed to the healthcare insurance industry, the following structure may be used:

| Word | Type of Aggregation |
| --- | --- |
| count | Count ( ) |
| number | Count ( ) |
| total | Sum ( ) |
| unique | Count (distinct ( ) ) |
| ... | ... |

In this example, if a natural language query 10 is directed to a "unique number of members", the system 1 may read "unique" to mean "Count (distinct( )" in relation to member ID values. Similarly, if a natural language query is directed to a "count" or "number", the system 1 may read that query to require a count of a particular set of data. Additionally, if a natural language query is directed to a "total", the system 1 may read that query to require a sum of a particular set of data.

Visual recommender knowledge bases may analyze the data returned by the structured data query and suggest recommended formats for visually displaying the data. In one example, the following structure may be used:

| # of columns | # of columns with numeric output | # of columns with date | # of rows | Visual Recommender |
| --- | --- | --- | --- | --- |
| 2 | 1 | | <5 | Pie |
| 2 | 1 | | >=5 | Bar |
| 3 | 1 | 1 | >3 | Line |
| 3 | 1 | 1 | <=3 | Table |
| ... | ... | ... | ... | ... |

In this example, based on the number of columns, number of columns with numeric output, number of columns with a date, and number of rows, the system 1 may recommend a particular visual display format. For instance, if the output data has 2 columns, the system 1 may recommend a visual display of a pie or bar chart. If the output data has 3 columns, the system 1 may recommend a visual display of a line graph or a table. The recommendation may be based on additional factors, such as the number of columns with numeric output, the number of columns having date data, the number of rows in the output data, and so on. The visual recommender knowledge base may allow the visual recommender 28 to automatically determine a visual output for the data, as discussed below.

The entity identifier 22 may identify identities using an identification process that includes combining phrases, number and date recognition, entity soft matching, and entity identification. This process is discussed in greater detail in FIG. 4, below.

The dependency mapper 23 may map a dependency tree of the plurality of identified entities. The dependency tree may be determined based on the parsed natural language query 10. The words and phrases parsed from the natural language query 10 may have dependency relationships, as discussed in FIG. 3, below. These dependencies may be mapped to the entities represented by the words and phrases.

The relationship mapper 24 may map the identified entities and code sets to relevant tables in the data structure, along with their table relationships. The relationship mapper 24 may utilize the code set knowledge base or the relationship table structure knowledge base to map the entities to the appropriate tables and document relevant table relationships. These knowledge bases may include the relationship structures between identified entities, as well as relationship structures between tables in the data lake 42 containing data and metadata relevant to the identified entities.

The aggregation and slice identifier 25 may identify any entities or code sets that require segmenting, such as slicing and dicing, or aggregation, for additional processing. The aggregation and slice identifier 25 may compare key words within the natural language query 10 against the aggregation and slice identifier knowledge base in order to determine how to segment the entities within the natural language query 10.

The structured query constructor 26 may construct a structured data query 27 using the relationships of the plurality of identified entities and their segments. In one example, the core entities needing visual presentation may be identified separately from the entities used to segment the data. The entities used to segment the data may remain present in nested queries, while the core entities are utilized in the main structured data query 27. The structured data query 27 may be sent to a structured query handler 40, which may apply the structured data query 27 to the data lake 42. The data lake 42 may return output data 44 to the structured query handler 40, which may be sent to a visual render engine 50.

The visual recommender 28 may recommend a visual output format for the output data 44 based on values given by the visual recommender knowledge base and the output data 44. The visual recommender 28 may send the recommendation to the visual render engine 50, which may automatically generate a return 60 to be displayed on the user 2's computer 3.

The return 60, or returned data, may include a visual output 62 of the output data 44. In one example, the return 60 may include a tabular output 64 if appropriate. In other examples, the visual output 62 may include graphs and charts, such as pie graphs, bar graphs, line graphs, X-Y plots, area charts, scatter plots, bubble plots, histograms, and the like. The visual output 62 may include more than one type of visual output where appropriate. In one example, the visual output 62 may include a visual output, such as a chart, directed to a portion of the output data 44, and additional visual outputs, such as a graph, directed to a different portion of the output data 44. This may depend on the user 2's query, the nature of the output data 44, and the visual recommender knowledge base.

The return 60 may be displayed on at least a portion of the display 4 of the computer 3. In one example, the return 60 may be displayed in a transitory state, such that the displayed information may not be recorded in the permanent memory of the computer 3. In another example, the return 60 may be saved as an appropriate format of visual file, including an image file such as a JPEG, PNG, or BMP, electronic document such as a .txt, .pdf, or .tif, or other file format as required during use. The return 60 may then be accessible to the user 2 or others on the network after it has been viewed. In another example, when the return 60 is directed to multiple types of output 62, 64, the system 1 may generate one or more types of files to the memory of the computer 3.

Figure 3:
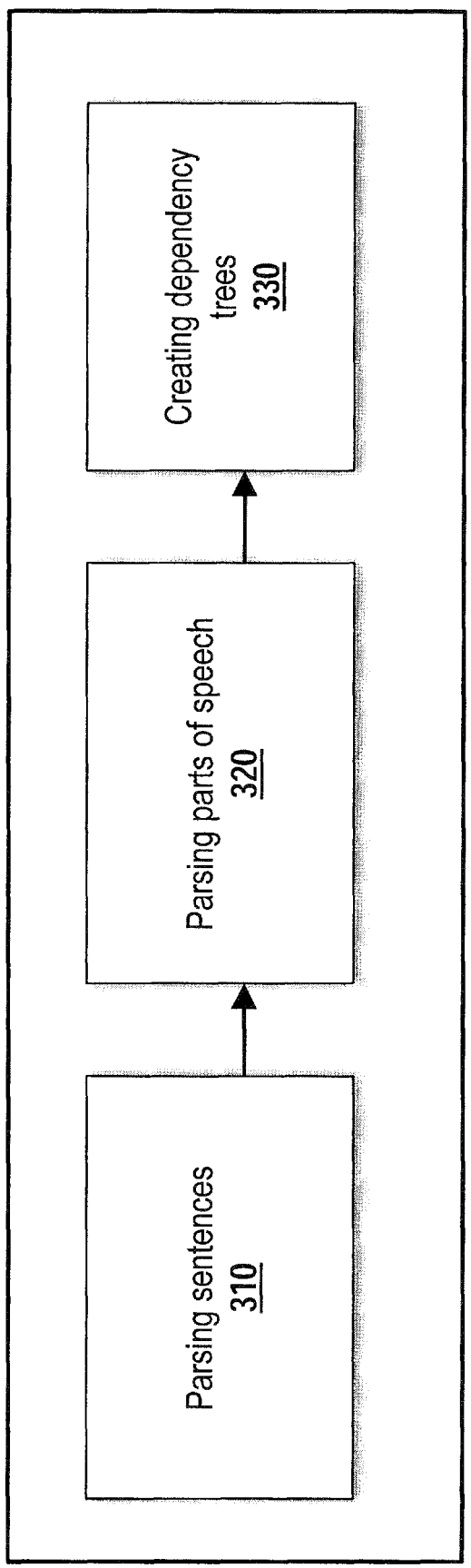
FIG. 3 is a flow diagram illustrating a natural language parsing process of the method for querying a data lake using natural language, in accordance with the first exemplary embodiment of the present invention.

FIG. 3 is a flow diagram illustrating a natural language parsing process of the method for querying a data lake using natural language, in accordance with the first exemplary embodiment of the present invention. The natural language parsing process may correspond, in software, to the natural language parser 21 of FIG. 2, above. The process may include one or more iterations of breaking the natural language query into granular components in order to determine entities within the natural language query. The iterations may include parsing sentences 310, parsing parts of speech 320, and creating dependency trees 330. Additional iterations may be included in order to obtain the desired level of granularity of the query content.

Step 310, parsing sentences, may include parsing the entirety of the natural language query in order to determine discrete sentences or logical query flows. For example, a natural language query may include one or more sentences within the query. A sentence parsing algorithm or a tokenizer may be used to demarcate and classify sections of a string of input characters to pass on for further processing. In the case of natural language, this may be done using delimiters such as spaces, periods, commas, and other punctuation. Parsed sentences may further be broken into individual words or phrases within the sentence. In one example, the sentence parser may be an unsupervised learning model based on regular expressions and abbreviation detection.

Step 320, parsing parts of speech, may include breaking down words and phrases into parts of speech that may indicate desired query targets, preparation instructions, and the like. In one example, a part of speech tagger may be a supervised model built on a corpus dataset, such as Brown Corpus, and trained using models such as a hidden markov model, a maximum entropy model, a support vector machine model, or a neural network (using perceptron learning).

Parsing parts of speech may include breaking the natural language query into constituent components, then tagging the components as parts of speech. For example, if a portion of the natural language query includes the phrase "count acute bronchitis", "bronchitis" may be identified as a noun, and "acute" may be identified as an adjective using contextual knowledge bases described above. The term "count" may be identified as a verb.

Step 330, creating dependency trees, may include determining the dependency relationships of the words, phrases, and parts of speech in order to determine how one affects another. In one example, the dependency tree creator may be trained using a natural language learning corpus dataset, such as CoNLL, and built using support vector machine models or neural network models. In the example above, once "count", "acute", and "bronchitis" have been identified as their corresponding parts of speech, dependency trees may be created between them. For instance, it may be determined that "acute" modifies the term "bronchitis". It may be determined that "count" is directed to the phrase "acute bronchitis." These dependencies may be determined, and their relational value to the data within the data lake may be mapped so that the structured query may be formulated.

In the method described in FIGS. 1-3, after the plurality of entities has been identified the dependencies determined in Step 330 may be mapped to the identified entities so that the dependencies between the identified entities can be determined. In one example, dependencies between entities may include number dependencies and date dependencies. Other dependencies may be determined depending on implementation.

Figure 4:
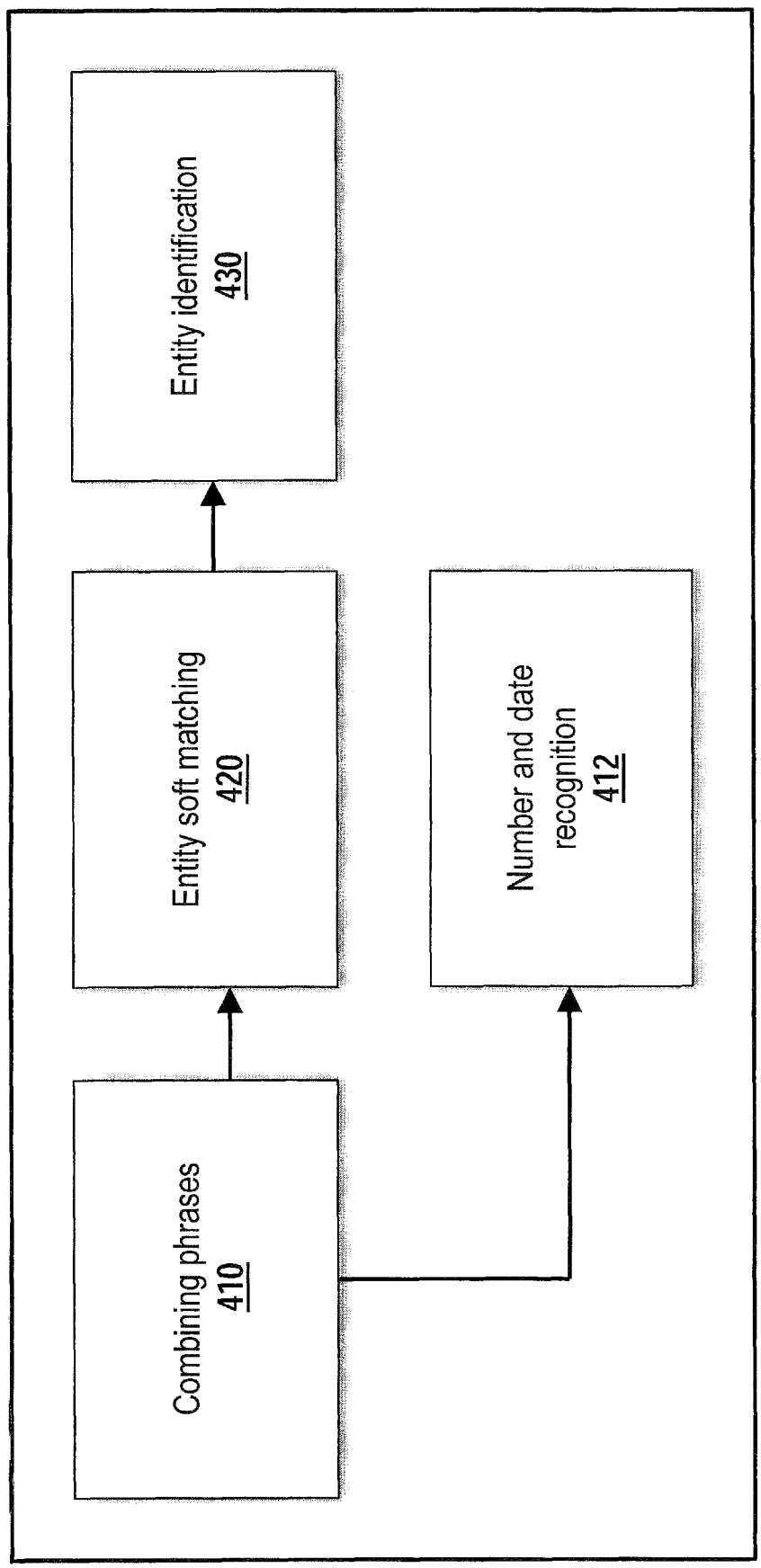
FIG. 4 is a flow diagram illustrating an entity identification process of the method for querying a data lake using natural language, in accordance with the first exemplary embodiment of the present invention.

FIG. 4 is a flow diagram illustrating an entity identification process of the method for querying a data lake using natural language, in accordance with the first exemplary embodiment of the present invention. The entity identifier 22, discussed in FIG. 2, above, may identify identities using an identification process that includes combining phrases 410, number and date recognition 412, entity soft matching 420, and entity identification 430. Step 410, combining phrases, may include combining the words determined during natural language parsing into phrases which fall in the same or related parts of speech. This may allow the system to determine context when comparing the entities within the phrases to entries in the contextualized knowledge bases. Number and date recognition, Step 412, may be performed as an ancillary step using regular expression pattern matches. This may be useful for further determining the context of the data desired in the natural language query. Step 420, entity soft matching, may include making one or more initial attempts to match the plurality of entities within the natural language query to at least one entry in at least one contextualized knowledge base discussed in FIG. 2. For instance, a phrase containing a plurality of entities may be compared with entries in an entity knowledge base, an entity thesaurus knowledge base, and a code set knowledge base. Soft matching may be carried out using fuzzy matching methodologies in one example. In another example, soft matching may be performed using matched edit distance algorithms, such as the Levenshtein Algorithm, or phonetic similarity algorithms such as Soundex, NYSIIS, Metaphone, and the like. The system may begin soft matching for a high confidence level value. In one example, the system may perform adjustments in order to determine a more accurate match. In Step 430, entity identification, an entity may be identified if a match is determined above a threshold confidence level. Entities matched below the threshold may be further analyzed to increase the confidence level, or they may be returned as an error to the user to provide correction or more specificity. Entities matched above the threshold may be identified as the entities within the contextualized knowledge base. The threshold confidence level may be determined by the user or by an optimization algorithm that determines the threshold based on historical accuracy.

Operating Example

The following operating examples are provided to illustrate how natural language queries may be converted to SQL queries using contextual knowledge bases and the systems and methods described relative to FIGS. 1-4, above. The table shows the conversion from natural language to SQL queries:

| Natural Language Query | SQL Query |
| --- | --- |
| Show me count of members by payer with acute bronchitis | Select payer_name, count(distinct(empi)) from insurance where empi in (select empi from diagnosis where diagnosis_code in ('J20.3','J20.4','J20.5','J20.6','J20.7','J20.8','J20.9','J20.0','J20.1','J20.2','J40')) group by payer_name |
| Give me count of members by payer with abdominal hysterectomy | Select payer_name, count(distinct(empi)) from insurance where empi in (select empi from procedure where code in ('51925','58150','58152','58180','58200','58210','58240','58541','58542','58543','58544','58951','58953','58954','58956','59135','59525','0UT90ZZ','0UT94ZZ','0UTC0ZZ','0UTC4ZZ')) group by payer_name |

| Natural Language Query | SQL Query |
|---|---|
| Show me count of members by payer with acute bronchitis and COPD | Select payer_name, count(distinct(empi)) from insurance where empi in (select empi from diagnosis where diagnosis_code in ('J20.3','J20.4','J20.5','J20.6','J20.7','J20.8','J20.9','J20.0', 'J20.1','J20.2','J40') and empi in (select empi from diagnosis where diagnosis_code in ('J44.0','J44.1','493.2','493.21','493.22','496'))) group by payer_name |

For instance, in the first row, the natural language query is directed to a count of the members by payers who have acute bronchitis. The system 1 may receive the natural language query, parse it to determine a plurality of entities within the query, and identify the plurality of entities using at least one contextual knowledge base. The natural language parser 21 may determine that "show" is a verb, "count", "members", "payer", and "bronchitis" are nouns, and "acute" is an adjective. The entity identifier 22 may determine that "members" or "payer" are entities. The dependency mapper 23 may determine that "acute" modifies "bronchitis", that "members" is modified by "payer", and that "show" and "count" are directed to the rest of the query. The relationship mapper 24 may map the relationships between the entities and the related data points or tables. The structured query constructor 26 may then construct a query using SQL, shown in the right column. The structured query 27 may be directed through the structured query handler 40 to the data lake 42, where the queried data may be retrieved and become output data 44.

The second and third row examples may be processed using the same method.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of querying a data lake using natural language, comprising the following steps:
receiving a natural language query directed to an electronic data lake;
parsing the natural language query to determine a plurality of entities within the natural language query;
identifying the plurality of entities using at least one contextual knowledge base, wherein the plurality of entities are tabulated in at least one of a plurality of data tables by entity type and compared against at least one entry in the at least one contextual knowledge base, wherein at least one phrase of the natural language query is combined, the plurality of entities are soft-matched, and at least one entity above a threshold confidence level is identified, and wherein a relationship table structure knowledge base provides a relationship between at least two of the plurality of entities by determining relational links at least two of the plurality of data tables;
mapping a dependency relationship between the plurality of identified entities to determine relational parts of speech of the plurality of identified entities based on the parsed natural language query;
constructing a structured data query based on the plurality of identified entities and the mapped dependency; and
automatically generating a visual output of a result of the structured data query, wherein a format of the visual output is recommended by a visual recommender knowledge base based on at least: a number of columns or a number of rows of the result of the structured data query.

2. The method of claim 1, wherein the at least one contextual knowledge base is selected from the set of: entity, entity thesaurus, code set, and aggregation and slice identifier knowledge bases.

3. The method of claim 1, wherein the visual output is a type selected from the set of: pie graph, bar graph, line graph, X-Y plot, area chart, scatter plot, bubble plot, and histogram.

4. The method of claim 3, comprising at least two types of visual output.

5. The method of claim 1, wherein the result of the structured data is saved as a file.

6. The method of claim 1, wherein the step of parsing the natural language query comprises the following steps:
parsing at least one sentence of the natural language query;
parsing at least one part of speech of the at least one sentence; and
creating a dependency tree based on the at least one part of speech.

7. The method of claim 1, further comprising the step of suggesting at least a portion of the natural language query.

8. The method of claim 1, wherein the structured data query is constructed in Structured Query Language (SQL).

9. A computerized system having a memory and a processor for querying a data lake using natural language, comprising:
an electronic data lake;
at least one contextual knowledge base; and
a user computer device in communication with the electronic data lake and the at least one contextual knowledge base over at least one network, wherein the user computer device has a processor and a non-transitory memory, wherein the processor of the user computer device is configured to:
receive a natural language query directed to the electronic data lake;
parse the natural language query to determine a plurality of entities within the natural language query;
identify the plurality of entities using the at least one contextual knowledge base, wherein the plurality of entities are tabulated in at least one of a plurality of data tables by entity type and compared against at least one entry in the at least one contextual knowledge base, wherein at least one phrase of the natural language query is combined, the plurality of entities are soft-matched, and at least one entity above a threshold confidence level is identified, and wherein a relationship table structure knowledge base provides a relationship between at least two of the plurality of entities by determining relational links at least two of the plurality of data tables;

map a dependency relationship between the plurality of identified entities to determine relational parts of speech of the plurality of identified entities based on the parsed natural language query;

construct a structured data query based on the plurality of identified entities and the mapped dependency; and automatically generate a visual output of a result of the structured data query on a display of the user computer device, wherein the visual output is recommended by a visual recommender knowledge base based on at least: a number of columns or a number of rows of the result of the structured data query.

10. The system of claim 9, wherein the at least one contextual knowledge base is selected from the set of: entity, entity thesaurus, code set, and aggregation and slice identifier knowledge bases.

11. The system of claim 9, wherein the visual output is a type selected from the set of: pie graph, bar graph, line graph, X-Y plot, area chart, scatter plot, bubble plot, and histogram.

12. The system of claim 11, comprising at least two types of visual output.

13. The system of claim 9, wherein the result of the structured data is saved as a file.

14. The system of claim 9, wherein parsing the natural language query comprises:
    parsing at least one sentence of the natural language query;
    parsing at least one part of speech of the at least one sentence; and
    creating a dependency tree based on the at least one part of speech.

15. The system of claim 9, wherein the user computer device is configured to suggest at least a portion of the natural language query.

16. The system of claim 9, wherein the structured data query is constructed in Structured Query Language (SQL).

17. The system of claim 9, wherein the display is selected from the set of: monitor, projector, screen, and wearable.

18. The system of claim 9, wherein the user computer device is configured to return a tabular data output displayed with the visual output.

* * * * *